United States Patent [19]

Brinkman

[11] Patent Number: 5,193,366

[45] Date of Patent: Mar. 16, 1993

[54] HOSE SECURING DEVICE WITH DUAL LOCK FEATURE

[75] Inventor: Robert J. Brinkman, Rochester, N.Y.

[73] Assignee: C. J. Winter Machine Works, Rochester, N.Y.

[21] Appl. No.: 806,235

[22] Filed: Dec. 12, 1991

[51] Int. Cl.$^5$ ............................................. E05B 73/00
[52] U.S. Cl. ........................................ 70/18; 70/58; 70/178; 70/232
[58] Field of Search ................... 70/14, 18, 19, 58, 59, 70/177, 178, 229–232; 285/80, 83

[56] References Cited

U.S. PATENT DOCUMENTS

| | | | |
|---|---|---|---|
| 725,290 | 4/1903 | Speer | 70/178 X |
| 748,720 | 1/1904 | Glazier | 70/178 |
| 924,824 | 6/1909 | Peebler | 70/18 |
| 1,347,262 | 7/1920 | Eichorn | 70/18 |
| 2,048,424 | 7/1936 | Caldwell | 70/232 |
| 4,057,983 | 11/1977 | Morgan | 70/18 |
| 4,326,747 | 4/1982 | Finnegan | 70/19 X |
| 4,630,456 | 12/1986 | Nielson, Jr. | 70/232 |
| 4,803,858 | 2/1989 | Parker | 70/178 X |
| 4,826,215 | 5/1989 | Sullivan | 285/80 |
| 5,033,280 | 7/1991 | Johnson | 70/178 X |

FOREIGN PATENT DOCUMENTS

| | | | |
|---|---|---|---|
| 18085 | of 1914 | United Kingdom | 70/232 |
| 368453 | 3/1932 | United Kingdom | 70/178 |

*Primary Examiner*—Renee S. Luebke
*Assistant Examiner*—Suzanne L. Dino
*Attorney, Agent, or Firm*—Shlesinger, Fitzsimmons & Shlesinger

[57] ABSTRACT

The device includes two elongate, identical members hinged together at one end, and having locking tabs projecting from their opposite ends for securing to two members in a closed position in which confronting operating surfaces there are secured over diametrically opposite sides of a garden hose at two axially spaced sections therealong. The confronting operating surfaces of said members have therein a first pair of semicircular, complimentary recesses surrounding a cylindrical coupling on one end of the hose, and having in the bottoms thereof coaxial, arcuate grooves in which diametrically opposite sides of the coupling are seated to prevent removal from the closed members. Another pair of confronting recesses in said operating surfaces frictionally engage diametrically opposite sides of the hose adjacent its opposite end to lock that end of the hose.

3 Claims, 2 Drawing Sheets

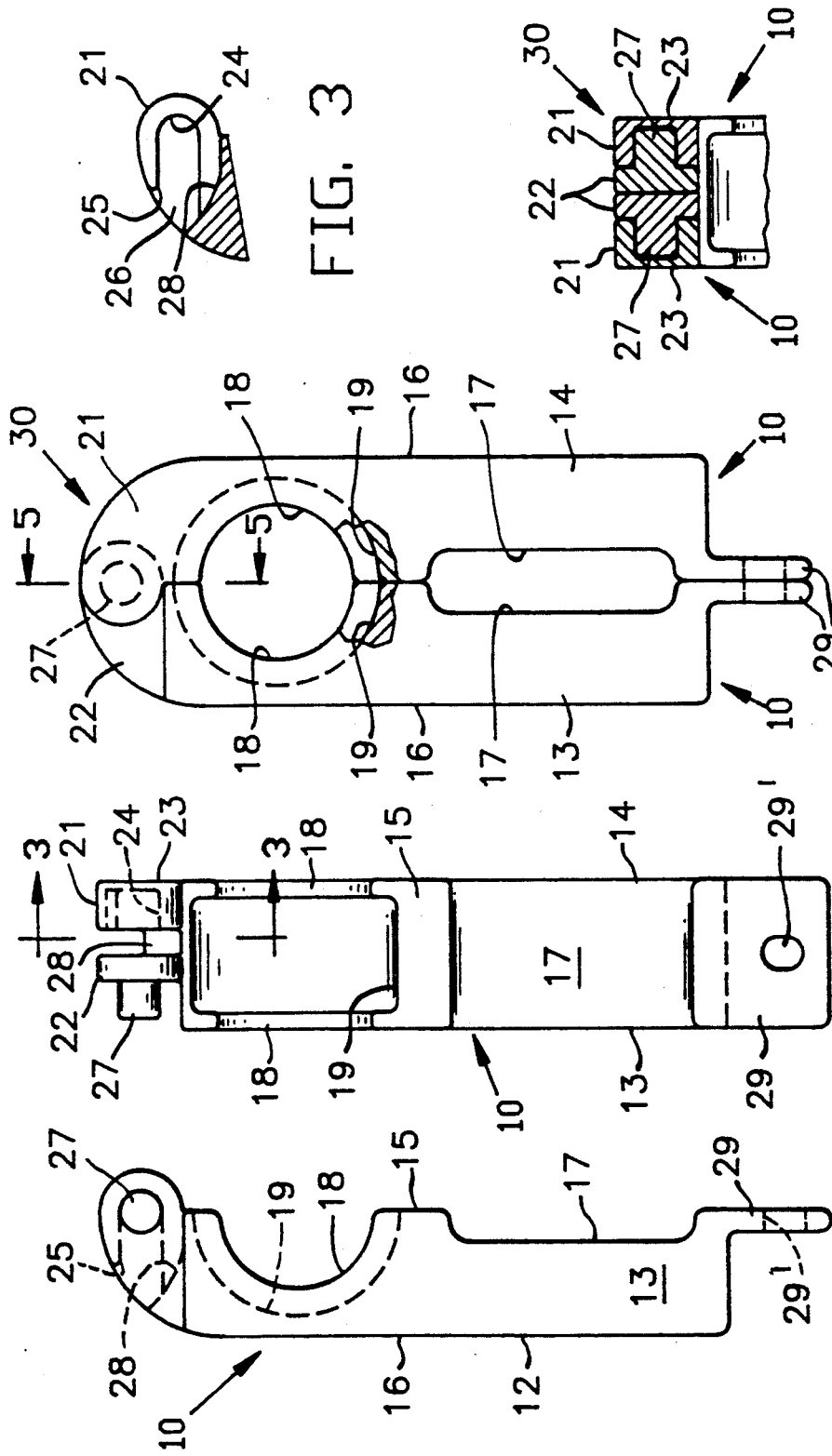

HOSE SECURING DEVICE WITH DUAL LOCK FEATURE

BACKGROUND OF THE INVENTION

This invention relates to security devices, and more particularly to a hose securing device intended to be used with a conventional padlock or the like. Even more particularly, this invention relates to a device capable of releasably securing a hose in at least two places to prevent theft or unauthorized use thereof.

A problem common to many golf courses, apartment complexes, public parks and not to mention individual homeowners, is the theft of garden hoses and other water carrying pipes that are left unattended for certain periods of time. In an effort to circumvent the theft of garden hoses and other water carrying pipes, golf courses, apartment complexes and public parks may reasonably install underground sprinkler systems. For individual homeowners, however, an underground sprinkler system is too expensive to even consider as an option. Therefore the only other alternative is to lock the hose against theft.

U.S. Pat. No. 924,824 discloses a security device which is not particularly designed for use in securing a garden hose. However, the device has a design consideration for securing one or more items between a pair of hinged members. This device also has incorporated therewith a locking means for maintaining the hinged members in a closed position.

U.S. Pat. No. 5,033,280 discloses a security device intended to protect against theft or vandalism of the hose coupling which communicates with the water supply of a recreational vehicle. This security device is comprised of two members connected by a hinge, one of which has thereon a locking means for fixedly securing the two members together, around the coupling and an associated dust cover. A second hose securing device, as disclosed in U.S. Pat. No. 4,803,858, comprises a hollow cylindrical body having a pair of hingedly connected elongate cylinder halves, each of the halves having attached thereto a perforated tab which, when placed in an overlapping relationship one over the other may incorporate a conventional lock apparatus, thereby securing the cylinder in a closed position over a hose coupling and the faucet to which it is attached. To prevent removal of the hose coupling from the cylindrical body, an internal annular flange is formed in one end of the body to provide a reduced-diameter opening through which the coupling cannot slide. A second flange formed in the cylindrical body adjacent its opposite end prevents withdrawal of the cylindrical body from the faucet.

Each of the above mentioned hose securing devices is capable only of a single function—i.e., preventing removal or disattachment of the hose coupling from its associated faucet. The other end of the hose, however, is left free such that the hose may still be subject to unauthorized use, simply by turning on the associated faucet. Moreover, the discharge or male end of the hose remains free to be manipulated in any manner desired. For instance, if used near a boat dock, devices of the type noted above could be used to prevent unauthorized removal of pressure regulators and the like from fluid supply sources. Again, however, the discharge ends of associated hoses would remain free to be manipulated by anyone.

Dual locking devices have been proposed in the past for various purposes, such as for example for locking an umbrella and satchel to a bench, or the like, as disclosed in U.S. Pat. No. 924,824. However, no such prior art devices have included first means for locking a hose coupling to a fluid supply, and second means for locking a different portion of the associated hose in a compressed mode as noted hereinafter.

Accordingly, one object of this invention is to provide a lockable hose securing device which performs the dual function of securing both the hose-faucet coupling as well as a second portion along the length of the hose.

Another object of this invention is to provide a hose securing device of the type described which is a greater deterent to hose theft than prior such devices.

Other objects of this invention will become apparent hereinafter from the specification and from the recital of the appended claims, particularly when read in conjunction with the accompanying drawings.

SUMMARY OF THE INVENTION

The improved hose lock device is comprised of two hingedly connected members which cooperate to form two hose receptacles therebetween, such that one receptacle is capable of securing the female end of the hose where it couples with a faucet or spigot, and the other receptacle is capable of securing the hose near its male end. At the end of the device opposite the member's hinge connection, overlapping perforated tabs align when the device is in a closed position, whereby a padlock or other conventional locking means may pass therethrough in order releasably to secure a hose therein against theft or use.

BRIEF DESCRIPTION OF THE DRAWINGS

FIG. 1 is a side elevational view of one of two, identical, complimentary locking members that are used for forming a hose securing device made according to one embodiment of the invention:

FIG. 2 is a front elevational view of this member;

FIG. 3 is a fragmentary sectional view taken generally along the line 3—3 in FIG. 2 looking in the direction of the arrows:

FIG. 4 is a front elevational view of two of these complimentary locking members hinged together and shown in their closed positions with portions thereof broken away and shown in section;

FIG. 5 is a sectional view of this device taken generally along the line 5—5 in FIG. 4 looking in the direction of the arrows.

DETAILED DESCRIPTION OF THE PREFERRED EMBODIMENTS

Figure 6:
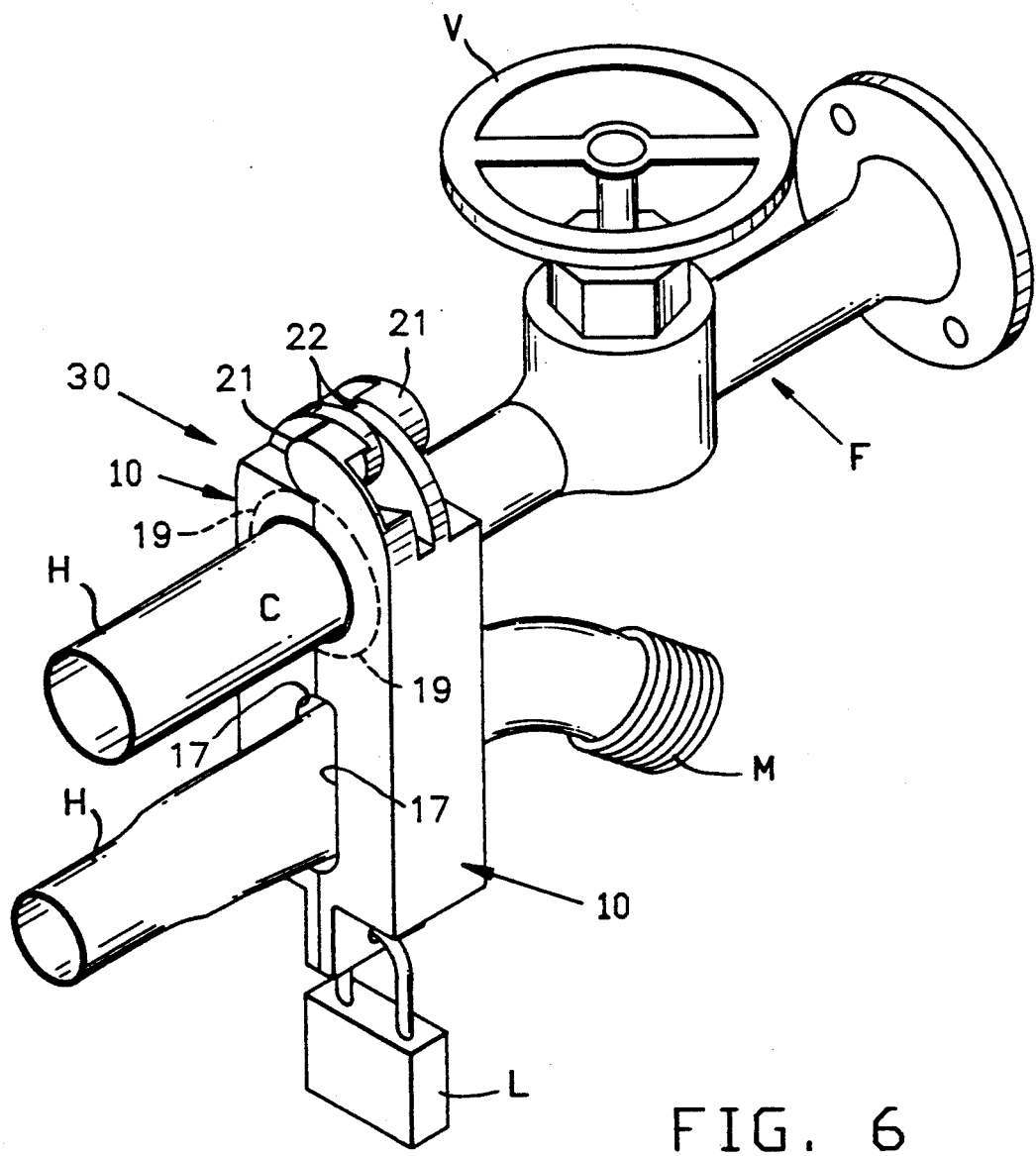
FIG. 6 is a fragmentary perspective view of the device as it appears when its complementary locking members are secured in dual locking positions over a hose adjacent opposite ends thereof.

Referring now to the drawings by numerals of reference, and first to FIGS. 1 and 2, 10 denotes generally one of two identical, cooperating locking members, which may be made from a rigid metal or plastic material, and which are utilized to produce a novel hose securing device of the type noted hereinafter. Member 10 comprises an elongate body section 12 which is generally rectangular in cross section, and which has spaced, parallel end walls 13 and 14 that intersect its spaced parallel side walls 15 and 16 at right angles. As shown more clearly in FIG. 1, the side wall 15 has therein a pair of transverse, longitudinally spaced recesses 17 and 18, opposite ends of which open on the end walls 13 and 14. Recess 17 is generally rectangular in configuration, while the recess 18 is semicircular in configuration and is disposed coaxially of an axis that extends transversely of the end walls 13 and 14. Although the bottom surface of the recess 17 is planar and extends without interruption between the end walls 13 and 14, the arcuate bottom wall or surface of the recess 18 has formed therein intermediate its ends a coaxial groove or socket section 19, which also is semicircular in configuration.

Intergral with and projecting from the upper end of the body section 12 are two, laterally spaced, arcuate lugs or projections 21 and 22. Lug 21 has a flat outside surface 23 disposed in coplanar relation with end wall 14, and a planar inside surface which is disposed in spaced, confronting relation to the lug 22. The inside surface of lug 21 has formed therein a circular recess 24 which is enclosed at its upper end by a hook-shaped section 25 of the lug (FIGS. 1 and 3), and which opens at one diametral side thereof through a slot 26 (FIG. 3) onto the exterior of the lug Projecting from the side of lug 22 remote from lug 21, and coaxially of recess 24 in lug 21, is a cylindrical projection 27 which, as noted hereinafter, is disposed to be seated removably in the recess 24 of a similar locking member 10, when two such members are utilized to produce a hose securing device of the type described hereinafter.

As shown more clearly in FIGS. 1 and 5, the space between lugs 21 and 22 is occupied by an arcuate ramp section 28, which extends between lugs 21 and 22 adjacent the lower ends thereof Integral with and projecting from the lower end of the body section 12 adjacent its side wall 15, and extending between the end walls 13 and 14 of the body section is a rectangularly shaped tang or projection 29. Tang 29 has in the center thereof a circular opening 29' that can be utilized for locking two such members 10 together as noted hereinafter.

Referring now to FIGS. 4 to 6, 30 denotes generally a hose securing device of the type which is adapted to be made from two identical locking members 10 by placing in confronting relation to each other the two ends which bear thereon the lugs 21 and 22 with the hook-shaped sections 25 thereon facing in opposite directions. The two members are then hingedly connected to one another by inserting or sliding the pin 27 on each member 10 through the slot 26 and into the registering recess 24 on the other member, so that the pins 27 fit snugly into recesses 24 as shown in FIGS. 4 and 5. The two members 10 can then be pivoted into the closed positions as shown in FIG. 4, so that the openings 29' and the two lugs 29 register with each other. At such time the recesses 17 and 18 of the respective members will register with each other as shown in FIG. 4, thus forming through the closed members a pair of openings one of which is circular in configuration, and the other of which is nearly rectangular in configuration.

Referring to FIG. 6, the hose securing device 30 is shown as it appears when utilized to lock between its two members 10 the conventional female coupling C of a hose H. In this FIG. the coupling C is shown threaded onto the male nozzle of a conventional faucet F, the operation of which is controlled by a manually operable valve V. When the device is used in this manner, the enlarged-diameter outer peripheral surface of the coupling C will become seated in the confronting grooves 19 in the two closed members 10, the complimentary grooves 19 thus forming a cylindrical socket or receptacle which surrounds the coupling C. At such time the coupling C is prevented from being withdrawn axially out of device 30 by virtue of the reduced-diameter sections of the semicircular recesses 18, which bound opposite ends of the confronting grooves 19. Also at this time a portion of the hose F adjacent its opposite, externally threaded end M can be secured between the confronting recesses 17 in the two members 10; and the lower ends of the members can be secured together by lock L, having a shackle which passes through the registering openings 29' in the two lugs 29 to prevent members 10 from being swung to their open positions. In this manner, both ends of the hose H are releasably locked in the device 30, both to prevent unauthorized removal of the hose from the faucet F, and also to prevent unauthorized use of the discharge end of the hose.

In practice, the respective depths of the recesses 17 can be selected either to prevent any water from passing through the hose H, when the device 30 is in its operative position as shown in FIG. 6; or alternatively, the depths of the recesses 17 can be selected only partially to compress the hose 17, so that water can still pass through the hose H from the faucet F even though the hose is locked in the position as shown in FIG. 6.

From the foregoing it will be apparent that the present invention provides relatively simple and inexpensive means for protecting a hose against theft or use. It also should be apparent that since the device 30 is comprised of two identical, one-piece parts or members, it may be simply and inexpensively produced and assembled. Moreover, the pivotal connection between the two parts or members 10 of device 30 do not require the use of a separate hinge pin; and when assembled, even the pin sections 27 of the members are hidden from view to discourage unauthorized tampering with the device. It should also be noted that the present invention may releasably be secured by a variety of different locks, such that the user of the present invention may select any lock which he or she believes to be most effective.

While this invention has been illustrated and described in connection with two like members cooperating to form two hose receptacles, it is to be understood that two members which cooperate to form more than two hose receptacles may also be employed without departing from the scope of this invention. Moreover, while this invention has been described in connection with only certain embodiments thereof it will be apparent that it is capable of still further modification, and that this application is intended to cover any such modifications as may fall within the scope of one skilled in the art or the appended claims.

I claim:

1. A locking device for securing at two spaced points along its length a hose of the type having thereon a cylindrical coupling for attaching one end of the hose to a supply of fluid, comprising:
   a pair of elongate locking members each having thereon an operating surface extending longitudinally thereof, and each of said members having in said operating surface thereof a pair of longitudinally spaced, transversely extending recesses,
   at least one of said recesses in each of said members having an arcuate bottom wall disposed coaxially of an axis that extends transversely of the associated operating surface, and each of said arcuate bottom walls having formed therein, and coaxially thereof, an arcuate groove disposed to encircle one diametral side of a cylindrical hose coupling, hinge means adjacent one end of each of said members and operatively connecting said members together for pivotal movement relative to each other about a hinge axis that extends parallel to the transversely extending axes of said arcuate bottom walls, and selectively into and out of closed positions in which said operating surfaces are disposed in engagement with diametrally opposite sides of a hose adjacent opposite ends thereof, and with said arcuate grooves disposed coaxially and snugly about diametrally opposite sides of a cylindrical coupling on said hose, adjacent one of two ends thereof, thereby to secure said coupling against axial movement between said closed members, the other of said recesses in each of said members being generally rectangular in configuration and having generally plane surfaces disposed to register with each other and frictionally to engage diametrally opposite sides of said hose to effect at least adjacent the other end thereof, when said members are closed thereover, and means for releasably securing said members in their closed positions.

2. A locking device as defined in claim 1, wherein said members are substantially identical.

3. A locking device as defined in claim 7, wherein said hinge means comprises a cylindrical projection on said one end of each of said members, and a circular recess in said one end of each member said circular recess in a respective one of said members being disposed in axially spaced, coaxial relation to said cylindrical projection thereon said cylindrical projection on each of said members being removably mounted in said circular recess in the other of said members for rotation coaxially of said hinge axis.

* * * * *